United States Patent [19]

Reed

[11] Patent Number: 4,817,460

[45] Date of Patent: Apr. 4, 1989

[54] INFINITELY VARIABLE STEERING TRANSMISSION

[75] Inventor: Bradley O. Reed, Pittsfield, Mass.

[73] Assignee: General Electric Company, Pittsfield, Mass.

[21] Appl. No.: 128,308

[22] Filed: Dec. 3, 1987

[51] Int. Cl.$^4$ ............................................. F16H 47/10
[52] U.S. Cl. ........................................ 74/687; 74/720; 74/720.5; 180/6.44
[58] Field of Search .................. 74/687, 689, 690, 720, 74/720.5; 180/6.3, 6.44, 6.48

[56] References Cited

U.S. PATENT DOCUMENTS

| | | | |
|---|---|---|---|
| 3,545,303 | 12/1970 | Whelahan | 74/720.5 |
| 3,575,066 | 4/1971 | Livezey et al. | 74/720.5 |
| 3,583,256 | 6/1971 | Livezey | 74/687 X |
| 3,590,658 | 7/1971 | Tuck | 74/720.5 X |
| 4,345,488 | 8/1982 | Reed | 74/687 X |
| 4,485,691 | 12/1984 | Reed | 74/687 |
| 4,569,251 | 2/1986 | Greenwood | 180/6.44 X |
| 4,682,515 | 7/1987 | Reed | 74/687 |
| 4,718,299 | 1/1988 | Greenwood | 74/720 X |

FOREIGN PATENT DOCUMENTS 3305295 8/1983 Fed. Rep. of Germany ........ 74/687
60-227045 11/1985 Japan ..................................... 74/687

Primary Examiner—Dwight G. Diehl
Attorney, Agent, or Firm—Bailin L. Kuch; Robert A. Cahill

[57] ABSTRACT

An infinitely variable steering transmission is constructed to utilize the unidirection, continuous outputs of a pair of traction drive units for accelerating and decelerating a track-laying vehicle through a first forward and reverse propulsion range and a plurality of higher forward propulsion ranges and for developing steering power in all ranges. The transmission includes a pair of interconnected output planetary gears sets and a single input planetary gear set for combining the traction drive unit outputs and the constant speed input from a suitable prime mover for first and third range propulsion and steering power. Second range propulsion and steering power is obtained exclusively from the traction drive units in a manner to also provide steer cancellation, a continuous drive unit stroking pattern, and synchronous range shifting.

19 Claims, 2 Drawing Sheets

INFINITELY VARIABLE STEERING TRANSMISSION

The present invention relates to multi-range steering transmissions for track-laying or skid-steered, wheeled vehicles.

An exemplary steering transmission of this type typically utilizes at least one and in most instances two separate hydraulic drive units mechanically driven by a prime mover at a normally constant speed and capable of developing, within limits, infinitely variable speed, bidirectional, hydrostatic outputs for ultimate application to the left and right transmission output shafts. These hydrostatic outputs are typically utilized alone to hydrostatically drive the transmission output shafts in a forward and reverse first propulsion range and are combined with mechanical inputs from the prime mover to hydromechanically drive the transmission output shafts in at least one and typically several higher forward propulsion ranges. Changes in the hydrostatic output speed provide infinite speed variation within the various ranges and ideally can also be utilized to effect steering by differentially varying the speeds of the two hydrostatic outputs.

A typical hydraulic drive unit may be of the type disclosed in Applicant's U.S. Pat. No. 3,815,698 entitled "Hydromechanical Steering Transmission" and, as such, includes a variable capacity ball piston pump and a normally fixed capacity ball piston motor connected in hydraulic fluid-coupled relation. The pumps are driven at a constant speed by the prime mover, and the motors develop the hydrostatic outputs. By varying the pump capacities, i.e., "stroking" as it is known in the art, the speeds of the motor hydrostatic outputs are varied accordingly. Also, by reversing the eccentricity of the pumps, the rotational direction of the motor hydrostatic outputs are reversed.

It is accordingly an object of the present invention to provide an improved infinitely variable steering transmission for a track-laying vehicle.

An additional object is to provide an infinitely variable steering transmission of the above-character, wherein the infinitely variable speed capability is provided in a simplified and efficient manner.

A further object is to provide an infinitely variable steering transmission of the above-character which is inexpensive to manufacture, requires a relatively low number of component parts, and is compact and light in weight, and is efficient in operation.

Other objects of the invention will in part be obvious and in part appear hereinafter.

SUMMARY OF THE INVENTION

In accordance with the present invention, there is provided an infinitely variable steering transmission for track-laying vehicles which utilizes drive units of the type which are capable of developing, in response to a constant speed mechanical input, an output speed infinitely variable between a minimum speed less than input speed and a maximum speed greater than input speed. These drive units can not however provide neutral (zero output speed) and their outputs are unidirectional (non-reversing).

The variable speed outputs of the two drive units are respectively applied to left and right output planetary gear sets drivingly connected with the left and right transmission output shafts. The constant speed mechanical input of the prime mover is applied via an input planetary gear set to both output planetary gear sets for interaction with the drive unit outputs to drive the transmission output shafts through either a forward and reverse first propulsion range or a forward third propulsion range depending upon the reaction to the prime mover constant speed mechanical input selectively established in the input planetary gear set. This constant speed mechanical input also fixes the speeds of corresponding gear elements of both output planetary gear sets during first and third range steering maneuvers effected by increasing the output speed of one drive unit by the same increment that the output speed of the other drive unit is decreased. To operate the transmission in a forward second propulsion range, the input planetary gear set is inactivated, and thus the transmission output shafts are driven exclusively by the drive unit outputs. In addition, the outputs of both drive units are combined by one of the output planetary gear sets to produce a steer cancelling effect in both output planetary gear sets, to establish the same steering convention as exists in the first and third ranges, and to accommodate a speed stroking control pattern for the drive units which is devoid of discontinuities as the vehicle is accelerated through the forward propulsion ranges. By appropriate selection of gear ratios, shifting from range to range is made synchronous.

The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference may be had to the following detailed description taken in conjunction with the accompanying drawings, in which FIG. 1 is a schematic illustration of an infinitely variable steering transmission constructed in accordance with the present invention;

FIG. 2 is a graph illustrating the operations of the two output planetary gear sets in the steering transmission of FIG. 1; and FIG. 3 is a graph of drive unit speed (RPM) versus vehicle speed (MPH) to illustrate the stroking pattern for the drive units in the transmission of FIG. 1 to achieve acceleration through the plural speed ranges.

Corresponding reference numerals refer to like parts throughout the various figures of the drawings.

DETAILED DESCRIPTION OF THE INVENTION

Figure 1:
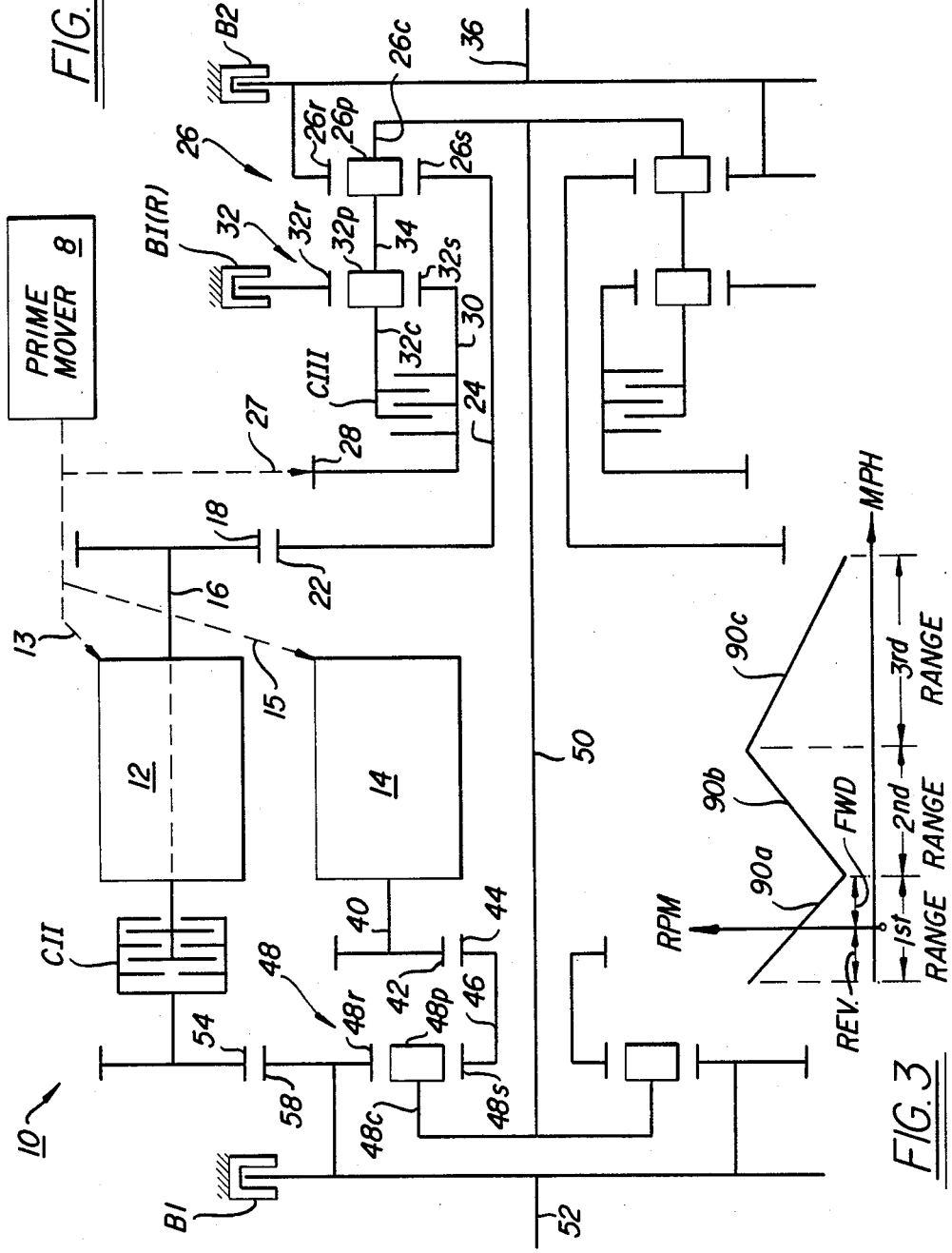

The track laying vehicle steering transmission of the present invention, generally indicated at 10 in FIG. 1, includes a first drive unit 12 and a second, identical drive unit 14. These drive units are, in accordance with the present invention, a type of transmission unit that provides in response to a constant speed input drive, an infinitely variable speed output ranging from some minimum speed less than input speed to some maximum speed greater than input speed. Other characteristics of this type of drive unit are that its direction of output drive cannot be reversed, i.e., no reverse capability, and its output speed does not go to zero, i.e., no neutral. Such drive units may take a variety of forms, such as toroidal traction drive units, V-belt drives having variable diameter pulleys, and the like. The identical, input drives to drive units 12 and 14, indicated at 13 and 15, respectively, are obtained from a suitable vehicle prime mover 8, such as a diesel or gas turbine engine operating at constant speed. The variable speed output of drive unit 12 appears on output shaft 16 on which is mounted a pinion gear 18 which drives a spur gear 22 carried by a sleeve shaft 24. Also carried by this sleeve shaft is the sun gear 26s of a right output planetary gear set, generally indicated at 26. The same constant speed input drive that is applied to drive units 12 and 14 is also applied, as indicated at 27, to a spur gear 28 mounted on a sleeve shaft 30 which also carries the sun gear 32s of an input planetary gear set, generally indicated at 32. Planetary pinion gears 32p of input planetary gear set 32 and planetary pinion gears 26p of output planetary gear set 26 are mounted on a common carrier, indicated at 34. Ring gear 26r of the output planetary gear set is directly connected to the right transmission output shaft 36. Ring gear 32r of input planetary gear set 32 is grounded upon activation of a brake BI(R) to put transmission 10 in a forward/reverse first speed range.

Output shaft 40 of drive unit 14 carries a pinion gear 42 which meshes with a spur gear 44 carried on a sleeve shaft 46. The ratio between gears 42 and 44 is the same as the ratio between gears 18 and 22. Sleeve shaft 46 also mounts the sun gear 48s of a left output planetary gear set, generally indicated at 48. Pinion gears 48p are mounted on a planetary carrier 48c which is physically connected via a cross shaft 50 to the common carrier 34 of planetary gear sets 32 and 26. Ring gear 48r of the left output planetary gear set 48 is directly connected with the left transmission output shaft 52. Brakes B1 and B2 are activated to ground ring gears 48r and 26r, respectively, and thus serve as vehicle stopping and parking brakes.

Upon engagement of a clutch CII, output shaft 16 of drive unit 12 also drives a pinion gear 54 which, in turn, drives a spur gear 58 directly connected to ring gear 48r of left output planetary gear set 48. As will be seen, clutch CII is engaged to apply the variable speed output of drive unit 12 to ring gear 48r of left output planetary gear set 48 and thence to left transmission output shaft 52 when transmission 10 is shifted into a second forward propulsion speed range.

Completing the structure of transmission 10 seen in FIG. 1, the constant input speed drive from the prime mover 8, indicated at 27 and appearing on sleeve shaft 30, is applied upon engagement of clutch CIII to directly drive the common carrier 34 of planetary gear sets 32 and 26, as well as carrier 48c of planetary gear set 48 via cross shaft 50. Thus the engagement of clutch CIII shifts transmission 8 into a third forward propulsion speed range.

As noted above, to shift transmission 10 into the forward/reverse first speed range, brake BI(R) is engaged to ground ring gear 32r of input planetary gear set 32. Since the constant speed prime mover input is driving sun gear 32s of input planetary gear set 32, common carrier 34 is driven at a reduced constant speed determined by the sun to carrier reduction of this planetary gear set. By virtue of the interconnecting cross shaft 50, planetary carrier 48c of left output planetary gear set 48 is driven at the same fixed reduced speed as common planetary carrier 34. While these two output planetary gear carriers are being revolved in unison by the mechanical input obtained from prime mover 8, the variable speed output of drive unit 12 is being applied as a separate mechanical input to sun gear 26s, and the variable speed output drive of drive unit 14 is being applied as yet another separate mechanical input to sun gear 48s. As a consequence, the two output ring gears 26r and 48r and thus transmission output shafts 36 and 52 are driven into rotation at speeds which are functions of the two mechanical inputs applied to each of the two output planetary gear sets.

Figure 2:
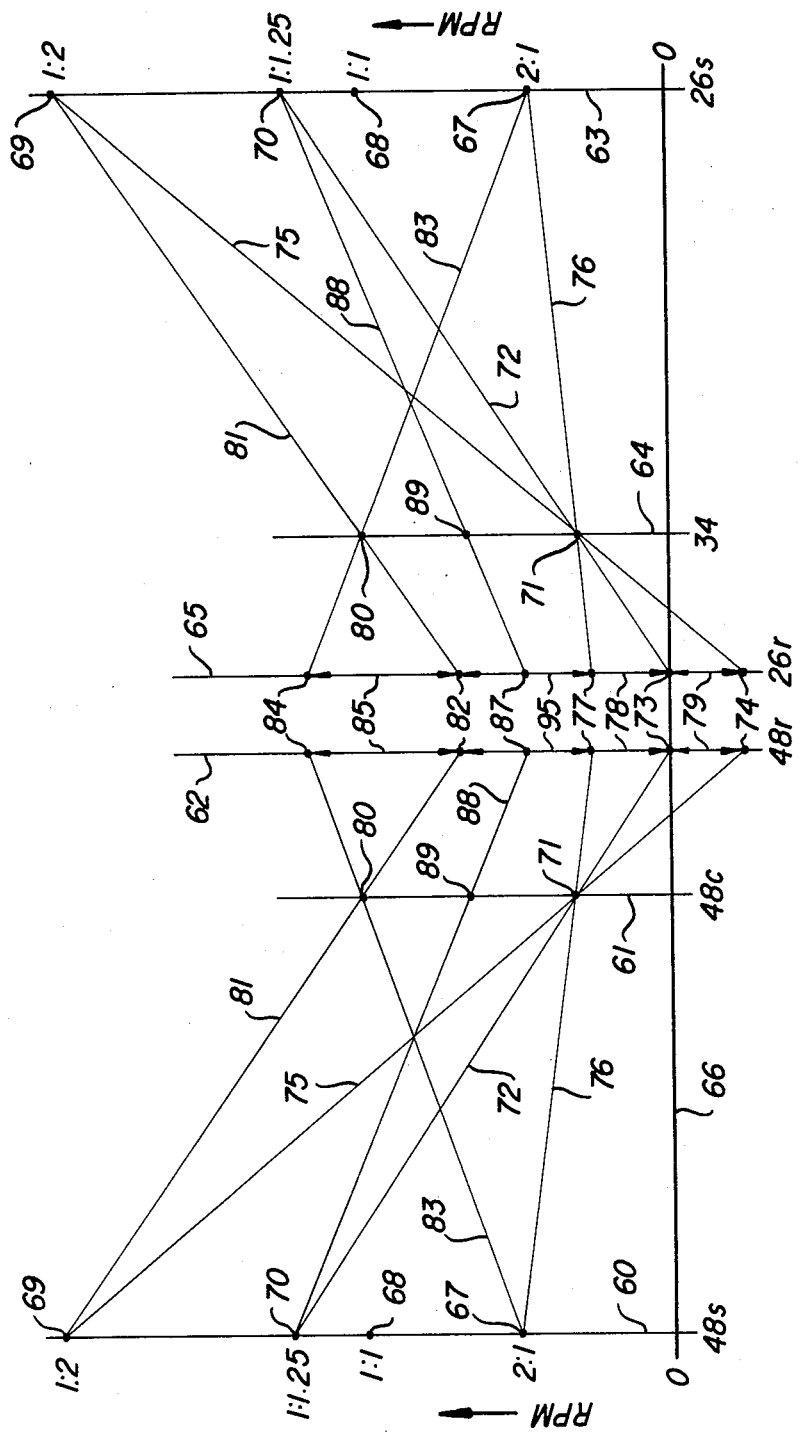

To more readily appreciate the operation of the output planetary gear sets 26 and 48, reference is made to FIG. 2 which is a graphical illustration of the relative angular velocities of the various elements of the two output planetary gear sets. With regard to left output planetary gear set 48, vertical line 60 represents the velocity operating range of sun gear 48s, vertical line 61 represents the velocity operating range of carrier 48c and vertical line 62 represents the velocity operating range of ring gear 48r. Similarly with regard to right output planetary gear set 26, vertical lines 63, 64 and 65 represent the velocity operating range of sun gear 26s, carrier 34, and ring gear 26r, respectively. The horizontal separation of vertical lines 60 and 61 is proportional to the number of teeth on ring gear 48r, while the horizontal separation of vertical lines 61 and 62 is proportional to the number of teeth on sun gear 48s. Thus, the horizontal separation between vertical lines 60 and 62 is proportional to the sum of the ring gear 48r and sun gear 48s teeth. The same proportionalities apply for the horizontal separations between vertical lines 63–65 for output planetary gear set 26. Since the two output planetary gear sets are of identical gears ratios, the separations between corresponding vertical lines are identical in each case. X axis 66 represents zero revolutions per minute (RPM), and points on vertical operating lines 60–65 correspond to the angular velocities of the respective planetary gear elements represented by these lines. Points above this axis 66 represent angular velocities in the forward propulsion direction, while points below this axis represent angular velocities in the reverse propulsion direction. A characteristic of planetary gears such as planetary gear 26 and 48 is that, under all operating conditions, the velocity points on the vertical operating lines of the various planetary gear elements will always lie on a single straight line. Thus, when two of the velocity operating points of the three planetary gear elements are known, the third velocity point will always lie on a straight line drawn through the two known velocity points.

As was noted above, drive units 12 and 14 are capable of producing output speeds varying from a predetermined reduction relative to constant input speeds to a predetermined overdrive relative to constant input speed. It will be assumed that these drive units are capable of providing infinitely variable output speeds ranging from a two to one reduction relative to input speed to a one to two step up or overdrive relative to input speed. Thus, velocity points 67, 68 and 69 on sun gear 48s vertical operating line 60 represent drive unit speed ratios of two to one, one to one and one to two, respectively. Velocity point 70 represents the mid point speed of this velocity spectrum, which is 1 to 1.25. Corresponding velocity points 67–70 are also shown on sun gear 26s vertical operating line 63. Preferably, the gear ratio of input planetary gear set 32 and the identical gear ratios for the two output planetary gear sets 26, 48 are established such that when sun gear 26s is driven by drive unit 12 at an angular velocity which corresponds to the midpoint of its velocity spectrum, i.e., velocity point 70 on line 63, the angular velocity of ring gear 26r is zero. This operating condition is satisfied if common carrier 34 is made to rotate by the prime mover acting through planetary gear set 32 at a velocity corresponding to point 71. Under these conditions, a straight line 72 drawn through points 70 and 71 intersects ring gear 26r operating line 65 at point 72 which lies on zero velocity axis 66. Since planetary carrier 34 is rigidly connected to planetary carrier 48c by cross shaft 50 (FIG. 1), the latter carrier must therefore be driven at the same speed which is also represented by velocity point 71 on vertical operating line 61. Thus, a straight line 72 drawn through operating point 71 on carrier 48c vertical operating line 61 and operating point 70 on sun gear 48s vertical operating line 60 intersects ring gear 48r vertical operating line 62 at point 73 which also lies on the zero velocity axis 66.

If drive units 12 and 14 are uniformly stroked upwardly in speed from the velocity operating points 70 on sun gear 26s vertical operating line 63 and sun gear 48s vertical operating line 60 toward their upper speed limits at points 69, ring gears 26r and 48r, and with them transmission output shafts 36 and 52, are driven in a first range reverse propulsion direction down to corresponding velocity operating points 74, assuming the prime mover output speed does not change and thus the velocity points 71 for the interconnected carriers 34 and 48c remain fixed. Under these conditions, velocity operating points 69, 71 and 74 for both output planetary carrier gear sets lie on respective straight lines 75. If the output speeds of drive units 12 and 14 are uniformly decreased from the velocity points 69 on the sun gear vertical operating lines down to the lower limits of the drive units velocity spectrum corresponding to velocity points 67, it is seen that the reverse propulsion speeds of ring gears 26r and 48r decrease to zero velocity and then start up in speed in the first range forward propulsion direction. When the drive units arrive at the corresponding lower ends of their common velocity spectrum at velocity points 67, straight lines 76 drawn through velocity points 67 and 71 for both output planetary gear sets are seen to intersect ring gear 26r vertical operating line 65 and ring gear 48r vertical operating line 62 at corresponding points 77 which represent maximum first range forward speed. Thus, the first forward propulsion speed range is represented by the double pointed arrows 78, while the first reverse propulsion speed range is represented by the double pointed arrows 79.

The preferred convention for executing a steer, and the one utilized in the present invention, is to increase the output speed of one drive unit 12, 14 by a predetermined amount, while decreasing the output speed of the other drive unit by the same predetermined amount. This has the effect of proportionately increasing the output speed of one transmission output shaft 36, 52 while decreasing the output speed of the other transmission output shaft by an equal amount. It can readily be seen from FIG. 2 that if the angular velocity of sun gear 26s is increased a given amount by increasing the output speed of drive unit 12, and the angular velocity of sun gear 48s is decreased by the same amount by decreasing the output speed of drive unit 14, the angular velocities of ring gears 26r and 48r respectively decrease and increase by equal amounts to effect a steer to the right. By the same token, decreasing the output speed of drive unit 12 by the same amount that the output speed of drive unit 14 is increased, a steer to the left is executed. Thus, the execution of a steer simply results in the straight operating line for planetary gear set 26 being rocked about the fixed velocity point of its carrier 34 in one direction, while the straight operating line for planetary gear set 48 is rocked through an equal arc in the opposite direction about the fixed velocity point of its carrier 48c; these carrier velocity points thus serving as fulcrums. Obviously, the degree of steer may be varied by increasing or decreasing the magnitudes of the increments by which the output speeds of the drive units are increased on the one hand and decreased on the other.

Before describing the operation of transmission 10 in its second forward propulsion range, third forward propulsion range operation will be described because it is basically identical to first forward propulsion range operation.

To shift transmission 10 out of its first range, brake BI(R) is released. To shift from the second forward propulsion range to the third forward propulsion range, third range clutch CIII is engaged. This is seen to apply the constant speed input of prime mover 8 on sleeve shaft 30 directly to common planetary carrier 34 and also to planetary carrier 48c via cross shaft 50. In FIG. 2 this is seen to impose an angular velocity on these carriers which is represented by velocity points 80 on carrier vertical operating lines 61 and 64 which are horizontally aligned with points 68 on sun gear 48s vertical operating line 60 and sun gear 26s vertical operating line 63. This is so since, as noted above, velocity points 68 correspond to a one to one speed ratio being established in drive units 12 and 14, and thus their output speeds are both equal to the speed of the prime mover mechanical input. It is seen that speed variations in the third propulsion range are effected in exactly the same manner as in the first propulsion range. Drive units 12 and 14 are uniformly stroked downwardly in speed from points 69 on the sun gear vertical operating lines to velocity points 67 in order to speed up through the third propulsion range. This is confirmed in FIG. 2 as straight lines 81 drawn for the two output planetary sets from points 69 through points 80 intersect the ring gear vertical operating lines at points 82, which represent minimum speed in the third propulsion range. Also, straight lines 83 drawn through points 67 and 80 intersect the ring gear vertical operating lines at points 84, which represent maximum speed in the third propulsion range. Thus, the third forward propulsion speed range can be represented by the double pointed arrows 85 in FIG. 2. Third range steer is effected simply by respectively increasing and decreasing the output speeds of drive limits 12 and 14 by equal amounts, which has the effect of rocking operating lines of the left and right output planetary gear sets through equal angles in opposite directions about the fixed velocity point fulcrums 80 imposed on carriers 48c and 34 by the constant speed prime mover input.

As mentioned above, to shift transmission 10 from its first forward propulsion range to its second forward propulsion range, brake BI(R) is released, and second range clutch CII is engaged. This is seen in FIG. 1 to create the condition wherein the variable speed output of drive unit 12 is applied not only to sun gear 26s of right output planetary gear set 26, but also to ring gear 48r of left output planetary gear set 48 via pinion gear 54 and spur gear 58. Thus, left output planetary gear set 48 receives two mechanical inputs, the first being the variable speed output of drive unit 14 on its sun gear 48s and the second being the variable speed output of drive unit 12 on its ring gear 48r. Also, since brake BI(R) is released, there is no reaction force in input planetary gear set 32 to the prime mover input on sun gear 32s, and thus this constant speed input does not drive common carrier 34 during second range forward propulsion.

From FIG. 2 it is seen that, in first range, as drive units 12 and 14 are uniformly stroked downwardly in speed toward minimum output speed represented by points 67, ring gears 48r and 26r uniformly increase in velocity toward maximum first range forward speed corresponding to points 77. When second range clutch CII is engaged, drive unit 12 then begins driving ring gear 48r at a velocity proportional to the ratio established between pinion gear 54 and spur gear 58. It is now seen that, with regard to left output planetary gear set 48, uniformly stroking the drive units 12 and 14 upwardly in speed causes the velocity point on sun gear 48s vertical operating line 60 to move upwardly as does the velocity point 77 on ring gear 48r vertical operating line 62. Thus, as the drive units 12 and 14 are uniformly stroked upwardly and downwardly in speed consistent with straight ahead second range propulsion, the velocity points on sun gear 48s vertical operating line 60 and ring gear 48r vertical operating line 62 uniformly move up (acceleration) and down (deceleration) at fixed proportionate rates determined by the ratio between pinion gear 54 and ring gear 58. Under these circumstances, carrier 48c velocity point must move upwardly and downwardly on its vertical operating line 61 correspondingly in order to satisfy the straight line operating rule for planetary gear sets. For example, if drive unit 14 is stroked upwardly during second range operation from velocity point 67 on sun gear 48s vertical operating line 60 to mid-range speed corresponding to velocity point 70, ring gear 48r will have been driven upwardly by drive unit 12 from velocity point 77 to velocity point 87 which corresponds to the mid-speed point in the second forward propulsion range. When straight line 88 is drawn between points 70 and 87, it is seen that the velocity point 71 on carrier 48c vertical operating line 61 must move upwardly to point 89.

Now looking at the right hand output planetary gear set 26, since the carrier 48c of the left output planetary gear set 48 is connected to carrier 34 of the right output planetary gear set by cross shaft 50, these carriers must revolve at the same speed. Thus during mid-speed second range operation, velocity point 89 on carrier 34 vertical operating line 64 must assume relatively the same vertical position on the graph as does the velocity point 89 on the carrier 48c vertical operating line. Since straight ahead propulsion calls for the output speeds of drive units 12 and 14 to be equal, sun gear 26s is driven at a velocity corresponding to point 70 on vertical operating line 63. Thus, the straight operating line 88 for right output planetary gear 26 drawn through points 70 and 89 intersects the ring gear 26r vertical operating line 65 at point 87 whose vertical position is the same as that of velocity point 87 on ring gear 48r vertical operating line 62. From the foregoing description, it can be seen that the second forward propulsion range fills in the gap between the first and third forward propulsion ranges, with second range limits represented by double pointed arrows 95. This graphical demonstration that the speed imposed on ring gear 48r and thus left output shaft 52 by drive unit 12 is duplicated on right output shaft 36, can also be readily seen in FIG. 1 since, during straight ahead second range propulsion, the sun gears and carriers of the two identical planetary gear sets are respectively moving at the same angular velocities, and therefore their ring gears are constrained to move at the same angular velocity as well.

From the foregoing description and as graphically illustrated in FIG. 3, wherein the Y axis represents the common output speed in RPM of drive units 12 and 14 for straight line propulsion and the X axis represents vehicle speed in miles per hour (MPH), the drive units are stroked downwardly, as represented by straight line section 90a through first range propulsion in the reverse and then forward directions, stroked upwardly, as represented by straight line segment 90b, for forward propulsion through the second range, and then stroked downwardly, as represented by straight line segment 90c, for forward propulsion in the third range. This drive unit stroking pattern is continuous from range to range, and thus range shifting does not require abrupt changes in drive unit speed.

Still to be considered is second range steer. It is obviously extremely important that the steering convention as described above with respect to the first and third ranges be the same for the second range. That is, operator control and vehicle response during its steer should not vary from range to range. Thus, if the steer power path in the transmission is to avoid the utilization of added gear elements and clutches, steering in all three range must be effected by the same equal and opposite strokings of the two drive units 12 and 14. That is, a steer to the right must be effected by increasing the output speed of drive unit 12 by a preselected amount accompanied by decreasing the output speed of drive unit 14 by the same amount, and vice versa. With reference to FIG. 2, it is seen that this can be achieved in transmission 10 if the positions of the velocity points for carriers 48c and 34 are unaffected by the equal and opposite strokings of drive units 12 and 14 to effect a steer. That is, for example, if drive unit 14 is stroked downwardly to lower the position of the velocity point on sun gear 48s vertical operating line 60 and the position of the velocity point on carrier 48c's vertical operating line remains unchanged, the left output planetary gear operating line simply rocks in the counterclockwise direction about the fixed position of the carrier 48c velocity point, and thus the velocity point on ring gear 48r vertical operating line must move up by a proportionate amount. By the same token, when drive unit 12 is stroked upwardly by the same amount as drive unit 14 is stroked downwardly, the straight operating line for right output planetary gear 26 is rocked in the opposite or counterclockwise direction about the fixed position of carrier 34 velocity point, and thus the velocity point for ring gear 26r must move downwardly by a corresponding amount. It is thus seen under these circumstances that the speed of ring gear 48r is increased by the same amount that the speed of ring gear 26r is decreased, and the vehicle is steered to the right. A steer to the left is seen in FIG. 2 to be effected by stroking drive unit 14 upwardly in speed by the same amount that drive unit 12 is stroked downwardly in speed. It will be recognized that this is exactly the same steering convention that applied in the first and third ranges.

To ensure that the angular velocity of carrier 48c is unaffected during a second range steer, the mechanical speed inputs to the left output planetary gear set must be such that as the angular velocities of ring gear 48r and sun gear 48s are varied in relatively opposite directions, an average of these two speed inputs must be developed on carrier 48c. That is, an increase in the angular velocity of sun gear 48s which would tend to increase the angular velocity of carrier 48c must be exactly offset by an appropriate decrease in the angular velocity of ring gear 48r. It has been determined that this offsetting or steer canceling effect is obtained if the ratio of spur gear 44 to pinion gear 42 multiplied by the ratio of pinion gear 54 to spur gear 58 is equal to the ratio of sun gear 48s to ring gear 48r. Also by virtue of this particular gearing relationship, it is found that at 80 percent of maximum speed in the first forward propulsion range, second range clutch CII becomes synchronous, i.e., output shaft 16 of drive unit 12 is rotating at the same angular velocity as pinion 54 is being rotated by ring gear 48r via spur gear 58. This represents an opportune time to shift from the first forward propulsion range into the second forward propulsion range by engaging clutch CII and releasing brake BI(R). At 80 percent of maximum available speed in the second forward propulsion range, third range clutch CIII becomes synchronous in that carrier 34 is revolving at the same angular velocity as sleeve shaft 30. At this time, shifting from the second forward propulsion range into the third propulsion range can be smoothly effected by engaging the third range clutch CIII as clutch CII is disengaged. In this connection, it should be pointed out that the first second and third range forward propulsion limits represented in FIG. 3 by arrows 78, 95 and 85, respectively, are not in practice end-to-end as illustrated. Rather, at least twenty percent of the first range extends at its upper end into the lower end of the second speed range, and at least twenty percent of the second speed range extends at its upper end into the lower end of the third speed range to accommodate the synchronous range shifting described above. This speed overlap is also desirable to have available additional speed variation in the drive units 12, 14 for steering while the transmission is being operated near its range shifting points.

From the foregoing description, it is seen that the present invention provides a multi-range, infinitely variable, integral steering transmission for tracklaying vehicles, which is compact in size and inexpensive to manufacture, requires a minimal number of component parts, is efficient in operation and affords positive and uniform operator control in all of its multiple speed ranges. It is therefore seen that the objects set forth above, including those made apparent from the preceding description are efficiently attained, and, since certain changes may be made in the disclosed embodiment without departing from the scope of the invention, it is intended that all matter contained in the above description and shown in the accompanying drawings be interpreted as illustrated and not in a limiting sense.

Having described the invention, what is claimed as new and desired to secure by Letters Patent is:

1. A steering transmission comprising, in combination:
    A. first and second drive units each driven at a substantially constant speed for producing respective first and second unidirectional, continuous outputs infinitely variable between a minimum speed and a maximum speed;
    B. a first output planetary gear set drivingly connected to a first transmission output and including
        (1) a first sun gear,
        (2) a first ring gear,
        (3) a first planetary carrier, and
        (4) a first pinion gear set mounted on said first planetary carrier;
    C. a second output planetary gear set drivingly connected to a second transmission output and including
        (1) a second sun gear,
        (2) a second ring gear,
        (3) a second planetary carrier, and
        (4) a second pinion gear set mounted on said second planetary carrier;
    D. an input gear set;
    E. first means drivingly interconnecting said first and second output planetary gear sets;
    F. second means drivingly connecting said first drive unit to said first output planetary gear set;
    G. third means applying said second drive unit output to said second output planetary gear set;
    H. fourth means applying a substantially constant speed input to said input gear set, said input gear set being drivingly connected to one of said first and second output planetary gear sets;
    J. fifth means for selectively conditioning said input gear set to drive said one output planetary gear set at a speed having a first predetermined fixed ratio to said constant speed input, whereby to operate said transmission in one speed range; and
    K. sixth means for selectively applying said first drive unit output to second output planetary gear set, whereby to operate said transmission in another speed range different from said one speed range.

2. The steering transmission defined in claim 1, which further includes seventh means selectively operable to cause said input gear set to drive said one output planetary gear set at a speed having a ratio to the constant speed of said constant speed input different from said first predetermined ratio such as to operate said transmission in yet another speed range.

3. The transmission defined in claim 2, wherein said first means is a cross-shaft interconnecting said first and second planetary carriers.

4. The transmission defined in claim 3, wherein said first and second ring gears are drivingly connected to the first and second transmission outputs, respectively.

5. The transmission defined in claim 4, wherein said second means applies said first drive unit output to said first sun gear and said third means applies said second drive unit output to said second sun gear.

6. The transmission defined in claim 5, wherein said input gear set is a third planetary gear set.

7. The transmission defined in claim 6, wherein said third planetary gear set includes
    (1) a third sun gear,
    (2) a third ring gear, and
    (3) a third pinion gear set mounted on the planetary carrier of said one of said first and second output planetary gear sets.

8. The transmission defined in claim 7, wherein said fourth means applies said constant speed input to said third sun gear.

9. The transmission defined in claim 8, wherein said fifth means is a brake selectively activated to ground said third ring gear, whereby to operate said transmission in said one speed range as a forward and reverse first propulsion range.

10. The transmission defined in claim 9, wherein said sixth means comprises a first clutch selectively engageable to apply said first drive unit output to said second ring gear, whereby to operate said transmission in said another speed range as a second forward propulsion range.

11. The transmission defined in claim 10, wherein said seventh means comprises a second clutch selectively engageable to apply said constant speed input to the carrier of said one of said first and second output planetary gear sets, whereby to operate said transmission in said yet another speed range as a third forward propulsion range.

12. An infinitely variable steering transmission comprising, in combination:
   A. first and second drive units driven at substantially equal and constant speeds for producing respective first and second unidirectional, continuous outputs infinitely variable between corresponding minimum and maximum speeds;
   B. first and second output gear sets respectively connected to receive said first and second drive unit outputs and respectively drivingly connected to first and second transmission outputs;
   C. first means for selectively applying a mechanical input to said first and second output gear sets, the speed of said mechanical input being selectable between at least two different constant speeds, whereby to operate said transmission in at least two different speed ranges; and
   D. second means for selectively applying said first drive unit output to said second output gear set, whereby, with said mechanical input from said first means removed from said first and second output gear sets, said transmission is operated in yet another, different speed range.

13. The steering transmission defined in claim 12, wherein said mechanical input provides propulsion in said two speed ranges, and the application of said first and second drive unit outputs to said second output gear set provides both propulsion and steer cancellation in said yet another speed range.

14. The transmission defined in claim 13, wherein said first and second output gear sets are first and second planetary gear sets, each including a sun gear, a ring gear, a planetary carrier and a pinion gear set mounted on said planetary carrier.

15. The steering transmission defined in claim 14, wherein said ring gears of said first and second planetary gear sets are drivingly connected to said first and second transmission drive unit outputs, respectively, said planetary carriers of said first and second planetary gear sets are drivingly interconnected by a cross-shaft, said first drive unit output is applied to said sun gear of said first planetary gear set, and said second drive unit output is applied to said sun gear of said second planetary gear set.

16. The steering transmission defined in claim 15, wherein said second means comprises a first clutch selectively engageable to apply said first output to said ring gear of said second planetary gear set.

17. The steering transmission defined in claim 16, wherein said first means includes a third planetary gear set having a sun gear, a ring gear, and a pinion gear set mounted on said planetary carrier of one of said first and second planetary gear sets, said mechanical input being applied to said sun gear of said third planetary gear set.

18. The steering transmission defined in claim 17, wherein said first means further includes a brake for selectively grounding said ring gear of said third planetary gear set, whereby to operate said transmission in one of said two different speed ranges.

19. The steering transmission defined in claim 18, wherein said first means further includes a clutch for selectively applying said mechanical input to the planetary carrier of said one of said first and second planetary gear sets, whereby to operate said transmission in the other of said two different speed ranges.

* * * * *